Jan. 29, 1924.
J. LEY
WHEEL
Filed March 23, 1923
1,482,239
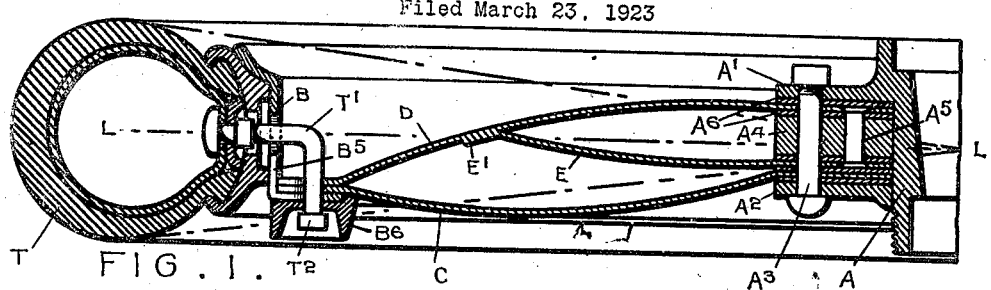
FIG. 1.
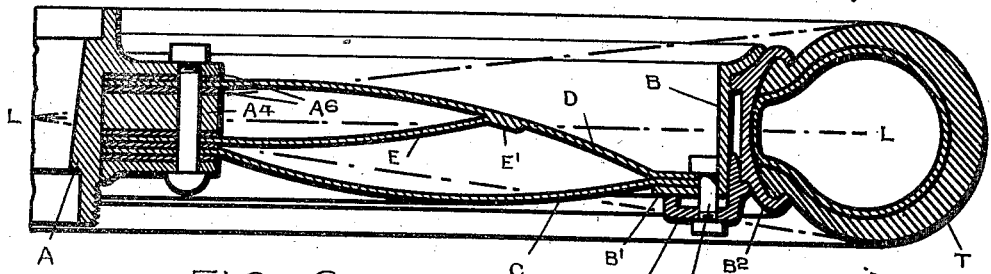
FIG. 2.
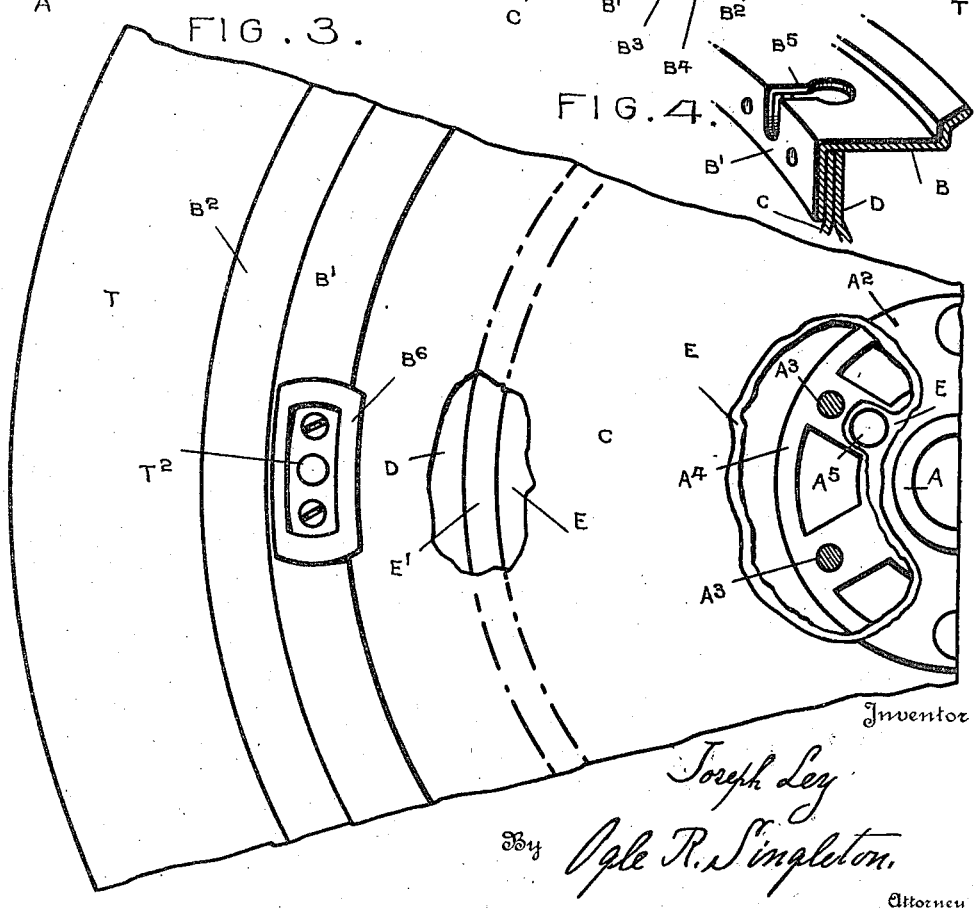
FIG. 3.
FIG. 4.
Inventor
Joseph Ley
By Ogle R. Singleton.
Attorney Patented Jan. 29, 1924.

1,482,239

UNITED STATES PATENT OFFICE.

JOSEPH LEY, OF PORTLAND, OREGON.

WHEEL.

Application filed March 23, 1923. Serial No. 626,999.

*To all whom it may concern:*

Be it known that I, JOSEPH LEY, a citizen of the United States, residing in the city of Portland, in the county of Multnomah and State of Oregon, have invented certain new and useful Improvements in Wheels, of which the following is a specification.

My invention consists in a new and useful improvement in wheels and is designed to provide a wheel for automobiles which comprises three pressed steel discs which by reason of their design and relation provide a maximum of strength and durability. The particularly novel features of my device are the means of attaching the several discs to the wheel hub and the peculiar disposition of one of the discs which forms a bracing medium interposed between the other two discs I have illustrated one specific embodiment of my improvement in the drawings filed herewith but it is to be understood that I do not consider my invention limited to said embodiment but refer for its scope to the claims appended hereto.

In the drawings;

Fig. 1 is a horizontal section of the left half of a wheel embodying my improvement.

Fig. 2 is a similar view of the right half of the wheel.

Fig. 3 is a side elevation of a fragment of my improved wheel parts being broken away.

Fig. 4 is a perspective view of a portion of the felloe of my improved wheel.

In the drawings my invention is illustrated as embodied in a wheel comprising the hub A, the felloe B and the three discs C, D and E. The hub A is provided at its inner end with an integral flange $A^1$ and at its outer end with a removable collar $A^2$ between which the discs C, D and E are clamped by the transverse bolts $A^3$. A filler ring $A^4$ surrounding the hub A is placed between discs D and E to which said discs are attached by means of rivets $A^5$. Suitable fibre gaskets $A^6$ are interposed between the flange $A^1$ the discs C, D and E, the filler ring $A^4$ and the collar $A^2$.

The felloe B is provided with a flange $B^1$ to which the outer edges of the discs C and D are attached, and there is provided the usual form of demountable rim $B^2$ with wedges $B^3$ fastened by bolts $B^4$ passing through the flange $B^1$ and the discs C and D. The tire T is mounted in the ordinary way by the rim $B^2$.

The portion of the disc C between the outer edge of the collar $A^2$ and the flange $B^1$ forms a convex surface on the outer face of the wheel and the corresponding portion of the disc D forms a convex surface on the inner face of the wheel. The intermediate disc E which is clamped in the hub immediately adjacent the disc C is oppositely curved relative to the inner disc D and its outer edge $E^1$ is welded to the inside surface of the disc D at a point intermediate the hub A and the felloe B. The disc E thus serves as a bracing member relative to the disc D. It is to be noted that the point of juncture of the disc E with the disc D is in line with the center of the hub A and the felloe B as indicated by the line L—L. It is also to be noted that the discs C and D lie entirely within the felloe B.

The felloe B has a slot $B^5$ which extends partly through the width of the flange $B^1$ to accommodate the angle valve $T^1$ of the tire T, which passes through the discs C and D and the flange $B^1$ when the tire T is applied to the wheel. By this arrangement the valve $T^1$ is rendered readily accessible upon the outer face of the wheel. The valve cap $T^2$ is protected by a plate $B^6$ bolted to the flange $B^1$ surrounding the outer end of the valve $T^1$ which serves also to close the portion of the slot $B^5$ in the flange $B^1$.

Having described my invention, what I claim is:

1. A vehicle wheel provided with two outside discs of similar diameter and an intermediate disc of lesser diameter, one of the outside discs and the intermediate disc being oppositely curved, and the intermediate disc being attached to the said oppositely curved outside disc.

2. A vehicle wheel provided with a hub, a felloe and three discs mounted on said hub, two of said discs being attached to said felloe and the periphery of the third disc being attached to one of the other discs intermediate the hub and the felloe.

3. A vehicle wheel provided with a hub provided with a flange and a removable collar, three discs confined on said hub between said flange and said collar, a filler ring interposed between two of said discs, said wheel being also provided with a felloe to which two of said discs are attached, the third disc having its periphery attached to one of the other discs.

In testimony whereof I affix my signature.

JOSEPH LEY.